Dec. 14, 1965 R. HANSEN 3,222,805
CATTLE GATE
Filed April 30, 1963
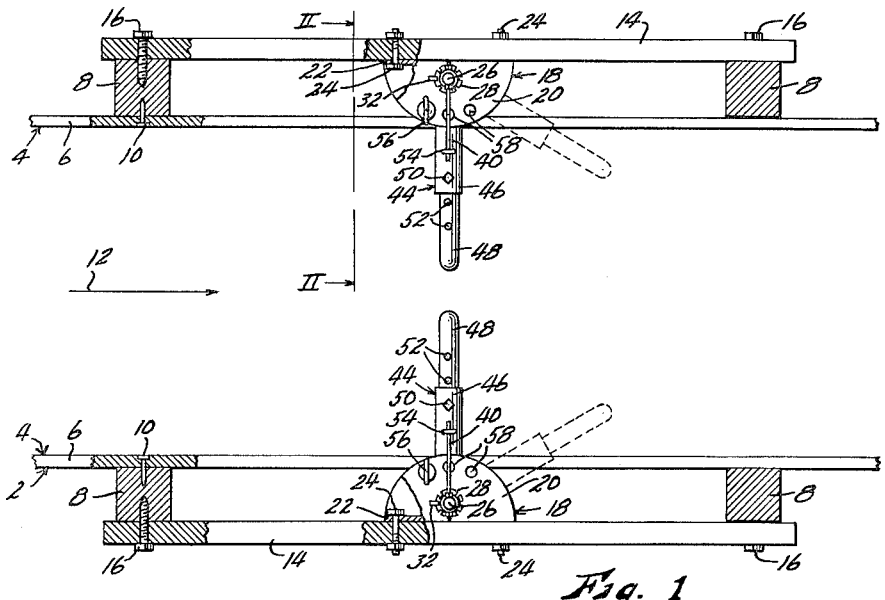
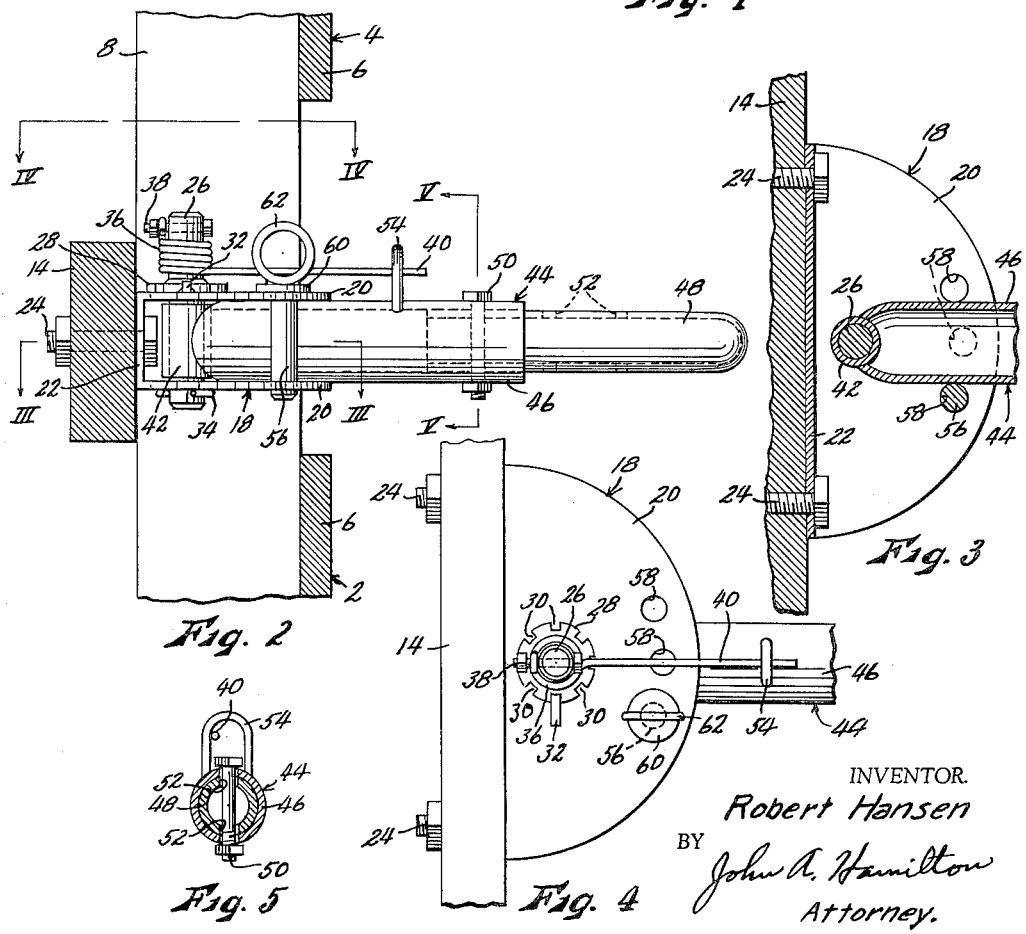
INVENTOR.
Robert Hansen
BY John A. Hamilton
Attorney.

United States Patent Office 3,222,805
Patented Dec. 14, 1965

1

3,222,805
CATTLE GATE
Robert Hansen, Strong City, Kans.
Filed Apr. 30, 1963, Ser. No. 276,740
2 Claims. (Cl. 39—84)

This invention relates to new and useful improvements in cattle gates, and has as its principal object the provision of a gate operable to permit movement of cattle or other livestock through a chute or other passageway in one direction only.

When driving cattle or other livestock through a chute for various purposes, such as dehorning, insecticide dipping and the like, it is often desirable to prevent the animals from backing up in the chute due to fright, in order to prevent congestion and confusion, and to keep the animals moving in the desired direction. The provision of a "one-way" gate for accomplishing this purpose in a simple, economical manner is the prime object of the present invention. Generally, the gate consists of members which normally obstruct the chute, but which move to positions not obstructing the chute in response to pressure of the animals' bodies thereagainst as the animals pass through the chute in one direction. After an animal has passed these members, they move automatically to their normal positions, whereby to prevent the animal from backing in the chute.

Another object is the provision of a gate of the character described wherein the members obstructing the chute are spaced apart to leave an apparent opening even when said gate is "closed." This apparent opening, while not sufficiently large to permit an animal to pass through it, is a psychological advantage in that the animal apparently believes he can pass through, and therefore does not balk at the sight of the gate, but presses through readily. With a gate which offers no apparent opening, even small, it has been demonstrated clearly that animals will balk, with much resulting confusion and possible injury to the animals.

Ancillary objects are the provision of a gate of the character described in which the degree of the apparent opening discussed above may be readily adjusted, which may be adjusted to chutes of various widths, in which the force biasing the gate to its closed position may be readily adjusted for use by animals of different weights and sizes, and which may be instantly released from outside the chute to permit animals to back up in the chute in the event of an emergency.

With these objects in view, as well as other objects which will appear in the course of the specification, reference will be had to the accompanying drawing, wherein:

FIG. 1 is a fragmentary top plan view of a section of a cattle chute including a cattle gate embodying the present invention, partially broken away, the gate being shown in a closed position in solid lines and in an open position in dotted lines, FIG. 2 is a fragmentary enlarged sectional view taken on line II—II of FIG. 1, FIG. 3 is a fragmentary sectional view taken on line III—III of FIG. 2, FIG. 4 is a fragmentary sectional view taken on line IV—IV of FIG. 2, and FIG. 5 is a sectional view taken on line V—V of FIG. 2.

2

Like reference numerals apply to similar parts throughout the several views, and the numeral 2 applies generally to a cattle chute consisting of a pair of vertical parallel walls 4 which may be solid, or as shown, formed of horizontally extending vertically spaced apart slats as boards 6, affixed to vertical posts 8 as by nails 10, it being understood that said posts are embedded at their lower ends in the ground. Said posts are disposed outside of the walls so as not to obstruct the chute passageway between the walls. It will be understood that cattle or other livestock animals are to pass through the chute only in the direction of arrow 12 in FIG. 1.

To serve as mountings for the gate forming the subject matter of the present invention, a pair of planks 14 are disposed respectively at the outer sides of the two chute walls 4, said planks extending horizontally and being affixed at their ends to the adjacent posts 8 as by screws 16. Said planks are preferably attached to the outer sides of posts 8, so as to be spaced apart from walls 4, for a purpose which will presently appear. Affixed to each plank 14, intermediate the posts 8 to which said plank is affixed, is a bracket 18, said bracket comprising a pair of horizontally extending, vertically spaced apart walls 20 joined together by a vertical back wall 22 integral with or welded thereto. Back wall 22 is affixed to the associated plank 14 by bolts 24, and walls 20 extend horizontally inwardly therefrom. A vertical pivot pin 26 is rotatably mounted in holes provided therefor in walls 20, and a circular index plate 28 is welded to said pivot pin so as to rest on the upper surface of top plate 20. Said index plate has a series of angularly spaced notches 30 formed in the edge thereof, said notches being adapted to be engaged selectively by a lug 32 welded to the upper surface of top plate 20, whereby to secure the pivot pin against rotation.

A cotter pin 34 is inserted through the pivot pin below lower plate 20 whereby normally to prevent said pivot pin from being elevated and thereby to secure index plate 28 in engagement with lug 32. However, when cotter pin 34 is removed, pivot pin 26 may be elevated slightly to disengage the index plate from lug 32, and said index plate turned to engage a different notch 30 thereof with the lug, for a purpose which will presently appear. Pivot pin 26 is extended above the index plate, and a helical torsion spring 36 is coiled about said upwardly extended portion. One end of said spring is affixed to a bolt 38 affixed in the pivot pin, and the opposite end portion of the spring is bent to form a straight, radially projecting spring arm 40.

Pivoted on pivot pin 26 between bracket walls 20 is a tubular bearing 42. The inner end of a gate arm 44 is welded or otherwise affixed to bearing 42, and extends radially therefrom sufficiently to extend partially across the chute. Said gate arm is adjustably extensible in length, having a tubular base portion 46 welded to bearing 42, and a tubular extension 48 telescoped slidably in the outer end of said base portion. A bolt 50 extends through base portion, and selectively through any one of a series of longitudinally spaced apart holes 52 formed in arm extension 48. By inserting said bolt through the properly selected holes 52, the length of each arm 44 may be adjusted as desired.

Affixed to the base portion 46 of each arm 44 is an eye member 54, and spring arm 40 is engaged in said eye, whereby gate arms 44 are biased rearwardly in chute 2, that is, in a direction opposite to arrow 12 in FIG. 1. The rearward pivotal movement of each gate arm is limited by a stop pin 56 engaged loosely in any one of a series of angularly offset holes 58 formed in bracket walls 20 adjacent the outer edges thereof. Said stop pin is provided at its upper end with a flange 60 which rests on the upper surface of top plate 20 to prevent said pin from falling through, and a finger ring 62 which may conveniently be grasped to remove said stop pin. In normal usage, stop pins 56 are set so that when gate arms 44 are in engagement therewith, said gate arms are substantially in axial alignment with each other, at right angles to the extent of chute 2, and the length of the gate arms is adjusted so that the inner free ends thereof are about six inches apart, all as shown in solid lines in FIG. 1.

In use, animals passing through chute 2 in the direction of arrow 12 press against gate arms 44, pivoting them forwardly against the pressure of springs 36, as shown in dotted lines in FIG. 1. This permits the animals to pass freely through the gate. However, when each animal has passed, springs 36 swing the gate arms back to their normal positions against stop pins 56, so that the animal cannot back in the chute, but can move only in a forward direction. The inner ends of arm extensions 48 are hemispherically rounded, as shown, in order to prevent any possible injury to the animals.

When the gate is used in connection with cattle, the chute walls 4 are ordinarily disposed about three feet apart, and gate arms 44 are disposed about 30 inches above the ground. However, these dimensions could be varied for animals of different sizes and heights. The placement of mounting planks 14 in outwardly spaced relation from chute walls 4 provides that brackets 18 need not project within the chute, where they would form fixed obstructions against which the animals might injure themselves. The gate arms may project between adjacent boards 6 forming the chute walls 4 as shown, or if the chute walls are solid, through openings formed therein for this purpose. The tension of springs 36 biasing the gate arms to their "closed" positions can be adjusted to the size of the animals using the chute by removing cotter keys 34, elevating index plates 28 and turning said plates to engage different notches 30 thereof with lugs 32, as previously described. In the event of an emergency threatening a "pile up" of animals at a point ahead of the gate, the gate may be instantly released, thereby permitting animals to back through the gate, by grasping finger rings 62 and removing stop pins 56. This of course may be done by an attendant outside of the chute itself.

The spacing or gap between the contiguous ends of arm extensions 48, when the gate is in its closed position, has in practice been shown to be of considerable importance. Even though this gap is of course far too narrow to permit the passage of an animal therethrough without pivoting the gate arms, it apparently causes the animal to view it not as a complete obstruction. Whatever the reasoning or thought processes of the animal, said animals freely approach, press against and pass through the gate when said gap is apparent, but have a strong tendency to balk and refuse to approach the gate if there is no such gap. Obviously, this is a distinct advantage, since balking can cause extreme congestion and possible injury to the animals. Animal acceptance of the gate can be still further improved, with animals which must use them frequently, by making the gap between the gate arms wider for the first few times an animal must pass therethrough, then narrowing it gradually during subsequent usages, until the animal becomes familiar with it. The gap may be widened either by adjusting the length of the arms after withdrawing bolts 50, or by setting stop pins 56 in others of holes 58 so that the gate arms are inclined forwardly in the direction animals travel through the chute.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A cattle gate for use in connection with a chute consisting of a pair of spaced apart vertical and generally parallel walls, said gate comprising:
   (a) a bracket,
   (b) means for supporting said bracket rigidly at a fixed elevation adjacent one of said chute walls,
   (c) an elongated gate arm pivoted at one end in said bracket for movement in a horizontal plane from an open position in which it extends forwardly in the direction of normal movement of cattle through said chute, and wherein it is disposed closely adjacent said wall and does not block said chute, to an intermediate closed position in which it extends partially across and blocks said chute, and further to a released position in which it extends rearwardly in a direction opposite to the direction of normal movement of cattle through said chute, and wherein it is disposed closely adjacent said wall and does not block said chute,
   (d) resilient means carried by said bracket and biasing said gate arm at all times in a direction to move it from said open position through said intermediate closed position to said released position, and
   (e) stop means carried by said bracket and normally arresting movement of said gate arm when said arm is in said closed position, whereby to prevent movement of said arm to its released position, said stop means being manually releasable from a position outside of said chute.

2. A cattle gate for use in connection with a chute consisting of a pair of spaced apart, vertical and generally parallel walls, said gate comprising:
   (a) a pair of brackets,
   (b) means for supporting said brackets rigidly at a fixed elevation respectively adjacent each of said chute walls,
   (c) an elongated gate arm pivoted in each of said brackets for movement in a horizontal plane from on open position in which said arms extend forwardly in the direction of normal movement of cattle through said chute, and wherein said arms respectively are disposed closely adjacent said walls and do not block said chute, to an intermediate closed position in which said arms are substantially aligned and extend transversely across said chute to block said chute, and further to a released position in which said arms extend rearwardly in a direction opposite to the normal direction of movement of cattle through said chute, and wherein said arms respectively are disposed closely adjacent said walls and do not block said chute,
   (d) resilient means carried by each of said brackets and biasing the associated gate arm at all times in a direction to move it from said open position through said intermediate closed position to said released position, and
   (e) a stop member carried removably by each of said brackets and normally arresting the associated gate arm when said arm is in said closed position, whereby to prevent movement of said arm to its released position, said stop member being manually removable from said bracket from a position outside of said chute.

(References on following page)

References Cited by the Examiner

UNITED STATES PATENTS

| | | | |
|---|---|---|---|
| 494,390 | 3/1893 | Smith | 39—92 |
| 675,041 | 5/1901 | Haldeman | 16—76 |
| 1,123,766 | 1/1915 | Lee | 39—88 X |
| 1,642,226 | 9/1927 | Buckner | 16—191 |
| 1,947,070 | 2/1934 | Traut | 160—23 |
| 2,579,463 | 12/1951 | Berglund | 39—28 |
| 2,592,230 | 4/1952 | Allen | 16—191 |
| 2,646,590 | 7/1953 | Milton | 16—80 |
| 2,651,074 | 9/1953 | Slopa et al. | 16—80 |
| 2,660,750 | 12/1953 | Wallen | 16—191 |
| 2,796,485 | 6/1957 | Durkee | 39—84 |
| 3,036,330 | 5/1962 | Hollidge | 39—22 |
| 3,079,711 | 3/1963 | Turner | 39—87 |

FOREIGN PATENTS 181,623 4/1955 Austria.

HARRISON R. MOSELEY, *Primary Examiner.*